US012528384B2

United States Patent
Isami et al.

(10) Patent No.: US 12,528,384 B2
(45) Date of Patent: Jan. 20, 2026

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Kenji Mizutani, Toyota (JP); Hirotaka Ikegami, Toyota (JP); Akihito Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 18/519,604

(22) Filed: Nov. 27, 2023

(65) Prior Publication Data
US 2024/0208359 A1 Jun. 27, 2024

(30) Foreign Application Priority Data
Dec. 21, 2022 (JP) .................. 2022-204361

(51) Int. Cl.
*B60L 58/13* (2019.01)
*B60L 15/20* (2006.01)
*B60L 58/14* (2019.01)

(52) U.S. Cl.
CPC ............. *B60L 58/13* (2019.02); *B60L 15/20* (2013.01); *B60L 58/14* (2019.02); *B60L 2240/12* (2013.01); *B60L 2250/16* (2013.01); *B60L 2260/26* (2013.01)

(58) Field of Classification Search
None
See application file for complete search history.

(56) References Cited

U.S. PATENT DOCUMENTS

2014/0358352 A1* 12/2014 Yamamoto ............... B60L 3/04
701/22
2023/0211700 A1* 7/2023 Jeoung .................. B60L 58/12
701/22

FOREIGN PATENT DOCUMENTS

JP 2022-036845 A 3/2022
WO WO-2019125328 A2 * 6/2019 .......... B60L 15/2045

* cited by examiner

Primary Examiner — Peter D Nolan
Assistant Examiner — Michael F Whalen
(74) Attorney, Agent, or Firm — SoraIP, Inc.

(57) ABSTRACT

A battery electric vehicle includes an accelerator pedal, a shifter, a mode selector, and a control device. The mode selector selects either an EV mode or an MT mode as a control mode for an electric motor according to a mode selection operation by a driver. When the SOC of a battery is within a predetermined range, the control device controls the electric motor in the control mode selected by the mode selector. When the SOC is out of the predetermined range, the control device controls the electric motor in the EV mode regardless of the control mode selected by the mode selector.

3 Claims, 6 Drawing Sheets

FIG. 6
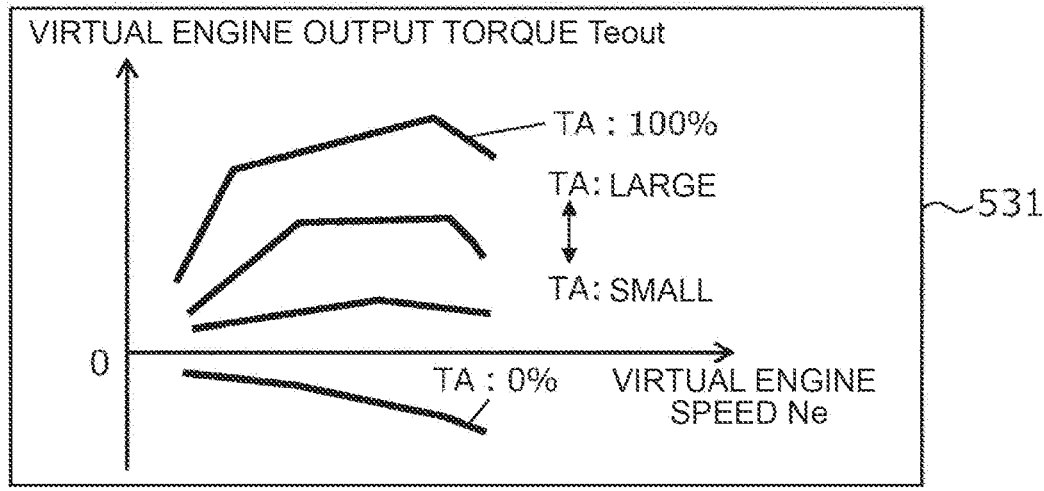
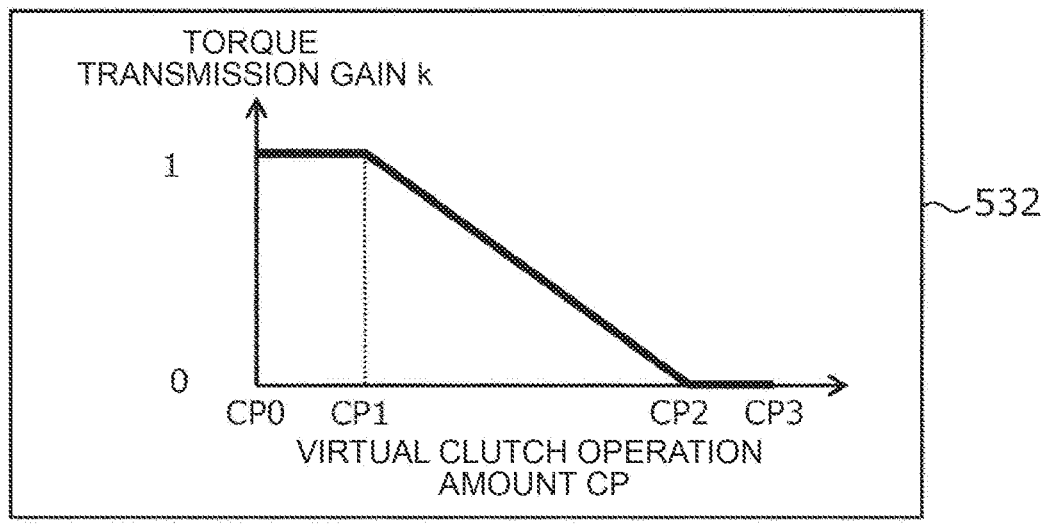
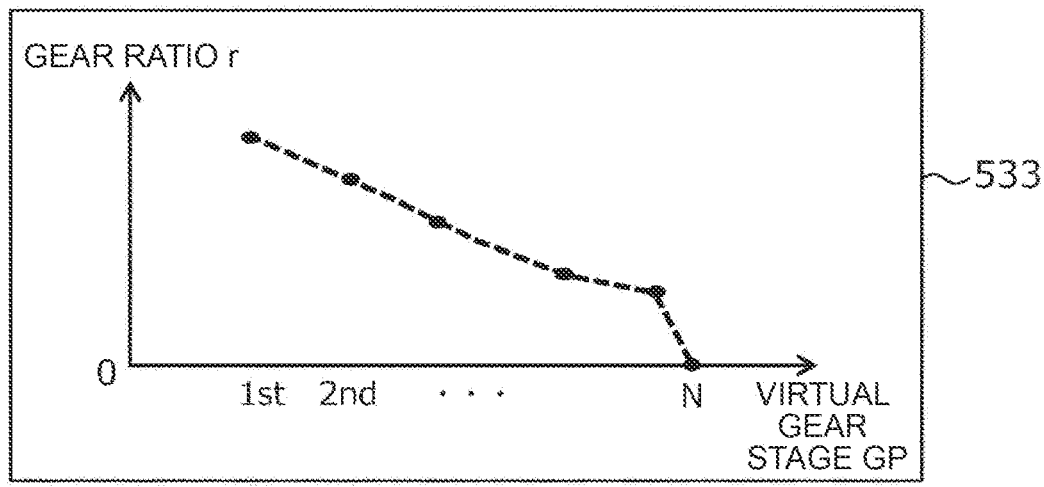

BATTERY ELECTRIC VEHICLE

CROSS-REFERENCE TO RELATED APPLICATION

This application claims priority to Japanese Patent Application No. 2022-204361 filed on Dec. 21, 2022, incorporated herein by reference in its entirety.

BACKGROUND

1. Technical Field

The present disclosure relates to battery electric vehicles using an electric motor as a traction power unit.

2. Description of Related Art

Japanese Unexamined Patent Application Publication No. 2022-036845 (JP 2022-036845 A) discloses a battery electric vehicle that can switch between the following two control modes: a control mode (hereinafter referred to as manual transmission (MT) mode) in which the battery electric vehicle has torque characteristics like those of a vehicle equipped with a manual transmission and an internal combustion engine (hereinafter referred to as manual transmission (MT) vehicle), and a control mode (hereinafter referred to as electric vehicle (EV) mode) in which the battery electric vehicle has torque characteristics of a normal battery electric vehicle.

SUMMARY

By allowing the driver to switch the battery electric vehicle between the MT mode and the EV mode, the driver can selectively enjoy driving the battery electric vehicle like driving an MT vehicle and driving the battery electric vehicle as a normal battery electric vehicle. However, driving a battery electric vehicle is constrained by the state of charge (SOC) of a battery. For example, in order to prevent the battery from going into the state of overdischarge in which the SOC is lower than its lower limit value, the power that is supplied during acceleration is limited by the allowable discharge power. In order to prevent the battery from going into the state of overcharge in which the SOC is higher than its upper limit value, the regenerative power during deceleration is limited by the allowable charge power.

In a battery electric vehicle, the supplied power and the regenerative power are controlled with reference to the SOC. However, when the MT mode is selected, the supplied power and the regenerative power are determined according to the manual operation by the driver. As a result, the SOC may become close to an overcharge region, and the supplied power may be limited by the allowable discharge power. Also, the SOC may become close to an overdischarge region, and the regenerative power may be limited by the allowable charge power. These limitations are against the driver's desire to drive a battery electric vehicle like he or she drives an MT vehicle.

The present disclosure was made in view of the above problems. It is one object of the present disclosure to allow a driver of a battery electric vehicle to enjoy both driving the battery electric vehicle like driving an MT vehicle and driving the battery electric vehicle as a normal battery electric vehicle by switching the control mode, and at the same time, to reduce the possibility that the enjoyment of driving may be spoiled by the condition of the SOC of a battery.

The present disclosure provides a battery electric vehicle that achieves the above object. A battery electric vehicle according to the present disclosure is a battery electric vehicle that uses as a traction power unit an electric motor configured to run on power supplied from a battery and stores regenerative power in the battery.

The battery electric vehicle of the present disclosure includes an accelerator pedal,
a shifter,
a mode selector, and
a control device configured to control an electric motor.

The mode selector is configured to select either a first mode or a second mode as a control mode for the electric motor according to a mode selection operation by a driver.

The control device is configured to, when an SOC of the battery is within a predetermined range, control the electric motor in the control mode selected by the mode selector, and when the SOC of the battery is out of the predetermined range, control the electric motor in the first mode regardless of the control mode selected by the mode selector.

The control device is configured to, when controlling the electric motor in the first mode, change an output of the electric motor according to an operation of the accelerator pedal regardless of an operation position of the shifter, and when controlling the electric motor in the second mode, change an output characteristic of the electric motor for the operation of the accelerator pedal according to the operation position of the shifter.

According to the battery electric vehicle of the present disclosure, the driver can selectively enjoy driving the battery electric vehicle as a normal battery electric vehicle by selecting the first mode and driving the battery electric vehicle like driving an MT vehicle by selecting the second mode. When the SOC is out of the predetermined range, the control mode is limited to the first mode, which reduces the gap between the feeling of acceleration or deceleration expected by the driver and the feeling of acceleration or deceleration the driver actually has.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 shows an example of an engine model, clutch model, and transmission model that constitute the MT vehicle model shown in FIG. 5.

DETAILED DESCRIPTION OF EMBODIMENTS

1. Configuration of Battery Electric Vehicle

Figure 1:
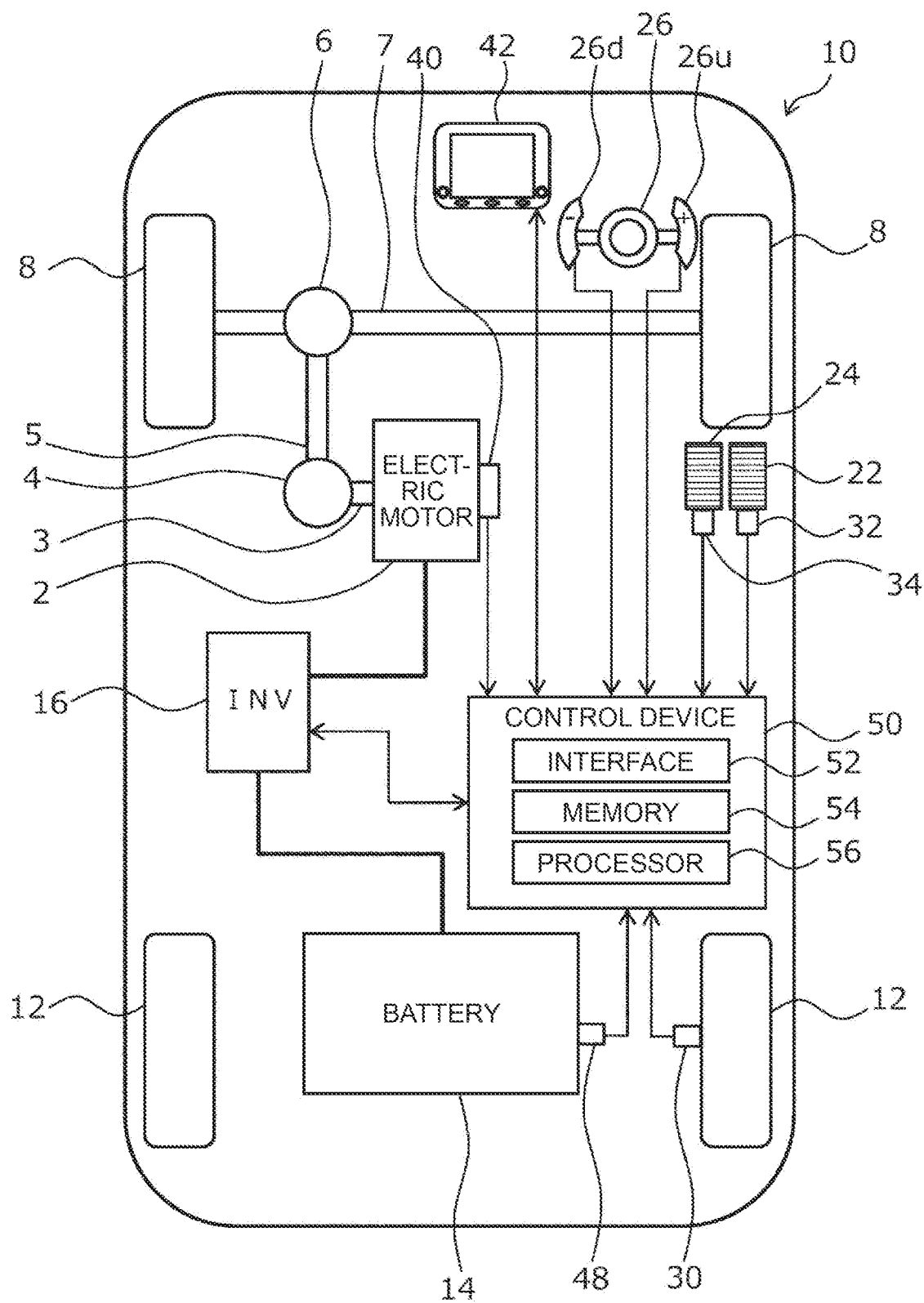
FIG. 1 schematically shows the configuration of a battery electric vehicle according to an embodiment of the present disclosure.

FIG. 1 schematically shows the configuration of a power system of a battery electric vehicle 10 according to an embodiment. As shown in FIG. 1, the battery electric vehicle 10 includes an electric motor 2 as a power source. The electric motor 2 is provided with a rotational speed sensor 40 for detecting the rotational speed of the electric motor 2. An output shaft 3 of the electric motor 2 is connected to one end of a propeller shaft 5 via a gear mechanism 4. The other end of the propeller shaft 5 is connected via a differential gear 6 to a drive shaft 7 in the front part of the battery electric vehicle 10. The battery electric vehicle 10 includes drive wheels 8 that are front wheels and driven wheels 12 that are rear wheels. The drive wheels 8 are provided at both ends of the drive shaft 7. Each of the wheels 8, 12 is provided with a wheel speed sensor 30. In FIG. 1, only the wheel speed sensor 30 for the right rear wheel is shown as a representative. The wheel speed sensor 30 is also used as a vehicle speed sensor for detecting the vehicle speed of the battery electric vehicle 10.

The battery electric vehicle 10 includes a battery 14 and an inverter 16. The battery 14 stores electrical energy for driving the electric motor 2. That is, the battery electric vehicle 10 is a battery electric vehicle (BEV) that runs on the electrical energy stored in the battery 14. The battery 14 is provided with a voltmeter 48. The inverter 16 converts direct current (DC) power input from the battery 14 during acceleration to driving power for the electric motor 2. The inverter 16 converts regenerative power input from the electric motor 2 during deceleration to DC power to charge the battery 14.

The battery electric vehicle 10 includes an accelerator pedal 22 for inputting an acceleration request to the battery electric vehicle 10 by a driver, and a brake pedal 24 for inputting a braking request to the battery electric vehicle 10. The accelerator pedal 22 is provided with an accelerator position sensor 32 for detecting the accelerator operation amount. The brake pedal 24 is provided with a brake position sensor 34 for detecting the amount of depression of the brake pedal 24.

The battery electric vehicle 10 further includes a pseudo paddle shifter 26. The pseudo paddle shifter 26 is a dummy that is different from a real paddle shifter. Typically, an MT vehicle with a paddle shifter is a clutch pedal-less MT vehicle, namely an MT vehicle without a clutch pedal. Therefore, the battery electric vehicle 10 includes the pseudo paddle shifter 26, but does not include a pseudo clutch pedal that resembles a clutch pedal. The pseudo paddle shifter 26 has a structure that resembles the structure of a paddle shifter provided in a clutch pedal-less MT vehicle. The pseudo paddle shifter 26 is attached to a steering wheel. The pseudo paddle shifter 26 includes an upshift switch 26u and a downshift switch 26d that determine the operation position. When the upshift switch 26u is pulled forward, an upshift signal is generated. When the downshift switch 26d is pulled forward, a downshift signal is generated.

The battery electric vehicle 10 includes a human-machine interface (HMI) unit 42. The HMI unit 42 includes a touch panel. The driver can select the control mode for the electric motor 2 using the touch panel of the HMI unit 42. In this case, HMI unit 42 functions as a mode selector. The control modes for the electric motor 2 include an MT mode and an EV mode. The HMI unit 42 as a mode selector is configured to select either the MT mode or the EV mode as desired. As will be described in detail later, in the EV mode, the electric motor 2 is controlled in a normal control mode (first mode) for common battery electric vehicles. In the MT mode, the electric motor 2 is controlled in a control mode (second mode) for driving the battery electric vehicle 10 like driving an MT vehicle. The touch panel of the HMI unit 42 also functions as a display, and can notify the driver of information by display. In this case, the HMI unit 42 functions as an information notification device. The information notified by the HMI unit 42 includes, for example, the currently selected control mode for the electric motor 2 and the remaining capacity of the battery 14.

The battery electric vehicle 10 includes a control device 50. Sensors and devices to be controlled that are mounted on the battery electric vehicle 10 are connected to the control device 50 via an information communication network. The control device 50 is typically an electronic control unit (ECU) mounted on the battery electric vehicle 10. The control device 50 may be a combination of a plurality of ECUs. The control device 50 includes an interface 52, a memory 54, and a processor 56. An in-vehicle network is connected to the interface 52. The memory 54 includes a random access memory (RAM) for temporarily recording data and a read-only memory (ROM) for storing programs that are executable by the processor 56 and various types of data related to the programs. Each program is composed of a plurality of instructions. The processor 56 reads and executes the programs and the data from the memory 54 and generates control signals based on the signals acquired from each sensor.

Figure 2:
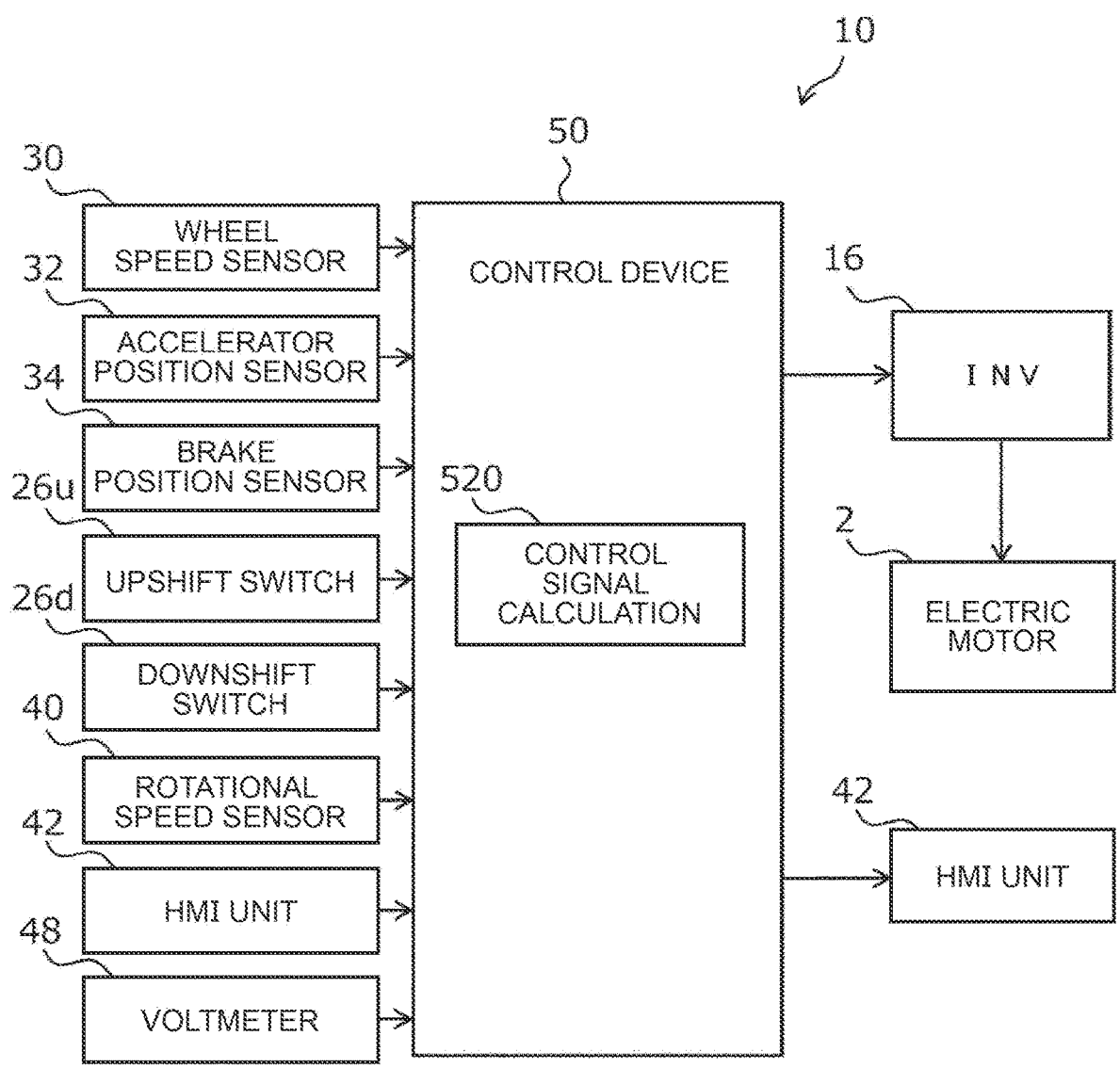
FIG. 2 is a block diagram showing the configuration of a control system for the battery electric vehicle shown in FIG. 1.

FIG. 2 is a block diagram showing the configuration of a control system for the battery electric vehicle 10 according to the present embodiment. The control device 50 receives signals input from at least the wheel speed sensors 30, the accelerator position sensor 32, the brake position sensor 34, the upshift switch 26u, the downshift switch 26d, the rotational speed sensor 40, the HMI unit 42 as a mode selector, and the voltmeter 48. The control device 50 also outputs signals to at least the inverter 16 and the HMI unit 42 as an information notification device. The control device 50 has a function as a control signal calculation unit 520. Specifically, the processor 56 functions at least as the control signal calculation unit 520 as the processor 56 executes the programs stored in the memory 54. Control signal calculation is a function to calculate control signals for actuators and devices. The control signals include at least a signal for controlling the inverter 16 by pulse width modulation (PWM) control. Functions of the control device 50 will be described below.

2. Configuration of Control Device

Figure 3:
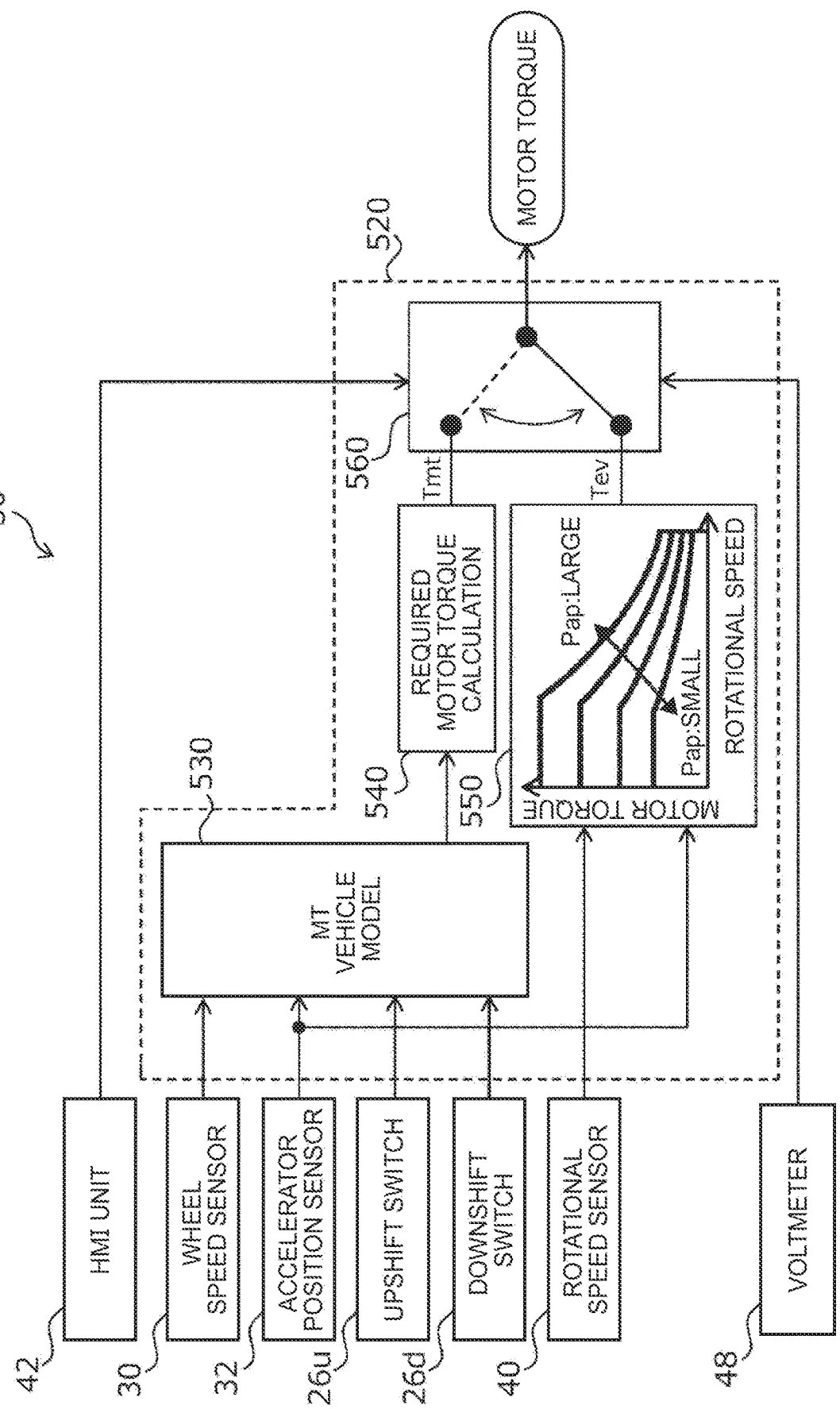
FIG. 3 is a block diagram showing functions of a control device of the battery electric vehicle shown in FIG. 1.

2-1. Motor Torque Calculation Function
2-1-1. Functions of Control Signal Calculation Unit FIG. 3 is a block diagram showing functions of the control device 50 according to the present embodiment, particularly functions related to calculation of a motor torque command value for the electric motor 2. The control device 50 calculates a motor torque command value using the functions shown in this block diagram, and generates a control signal for controlling the inverter 16 by PWM control based on the motor torque command value. As shown in FIG. 3, the control signal calculation unit 520 includes an MT vehicle model 530, a required motor torque calculation unit 540, a motor torque command map 550, and an output torque switching unit 560. The control signal calculation unit 520 receives signals from the wheel speed sensors 30, the accelerator position sensor 32, the upshift switch 26*u*, the downshift switch 26*d*, the rotational speed sensor 40, the HMI unit 42 as a mode selector, and the voltmeter 48. The control signal calculation unit 520 processes the signals from these sensors and calculates motor torque to be output from the electric motor 2.

There are two methods to calculate the motor torque by the control signal calculation unit 520: calculation using the MT vehicle model 530 and the required motor torque calculation unit 540, and calculation using the motor torque command map 550. The former calculation is used to calculate the motor torque when causing the battery electric vehicle 10 to travel in the MT mode. The latter calculation is used to calculate the motor torque when causing the battery electric vehicle 10 to travel in the EV mode. Which motor torque to use is determined by the output torque switching unit 560. The output torque switching unit 560 operates according to the signal input from the HMI unit 42 as a mode selector and the signal input from the voltmeter 48.

2-1-2. Calculation of Motor Torque in MT Mode

The MT vehicle model 530 is a model that calculates drive wheel torque that is supposed to be obtained by operating the accelerator pedal 22 and the pseudo paddle shifter 26 when the battery electric vehicle 10 is assumed to be a clutch pedal-less MT vehicle. The clutch pedal-less MT vehicle includes an engine, a sequential manual transmission (SMT), and a clutch that connects the engine and the SMT, but does not include a clutch pedal because the clutch is automatically operated. The drive wheel torque in the clutch pedal-less MT vehicle is determined by the operation of a gas pedal that controls fuel supply to the engine and the operation of a paddle shifter that changes the gear stage of the SMT. The engine, clutch, and SMT that are virtually implemented by the MT vehicle model 530 are hereinafter referred to as virtual engine, virtual clutch, and virtual SMT, respectively.

An accelerator operation amount Pap detected by the accelerator position sensor 32 is input to the MT vehicle model 530 as a manipulated variable for the gas pedal of the virtual engine. An upshift signal Su from the upshift switch 26*u* and a downshift signal Sd from the downshift switch 26*d* are input to the MT vehicle model 530 as inputs for the operation of a paddle shifter that determines the gear stage of the virtual SMT. The vehicle speed Vw (or wheel speeds) detected by the wheel speed sensors 30 is also input to the MT vehicle model 530 as a signal indicating the load state of the vehicle.

The required motor torque calculation unit 540 converts drive wheel torque Tw calculated by the MT vehicle model 530 to required motor torque Tm. The required motor torque Tm is the motor torque required to implement the drive wheel torque Tw calculated by the MT vehicle model 530. A reduction ratio from the output shaft 3 of the electric motor 2 to the drive wheels 8 is used to convert the drive wheel torque Tw to the required motor torque Tm.

2-1-3. Calculation of Motor Torque in EV Mode

In the EV mode, even if the driver operates the pseudo paddle shifter 26, this operation is not reflected in driving of the battery electric vehicle 10. That is, the operation of the pseudo paddle shifter 26 is disabled in the EV mode. The motor torque command map 550 used to calculate the motor torque in the EV mode is a map that determines the motor torque using the accelerator operation amount and the rotational speed of the electric motor 2 as parameters. A signal from the accelerator position sensor 32 and a signal from the rotational speed sensor 40 are input to the parameters of the motor torque command map 550. The motor torque corresponding to these signals is output from the motor torque command map 550. The motor torque command map 550 has been optimized so that the SOC of the battery 14 falls within an appropriate range.

2-1-4. Switching of Motor Torque

The motor torque calculated using the motor torque command map 550 is denoted by Tev, and the motor torque calculated using the MT vehicle model 530 and the required motor torque calculation unit 540 is denoted by Tmt. The motor torque selected by the output torque switching unit 560 from the two motor torques Tev, Tmt is given to the electric motor 2 as a motor torque command value. The output torque switching unit 560 operates according to the control mode selected by the HMI unit 42. When the EV mode is selected by the HMI unit 42, the output torque switching unit 560 connects to the motor torque command map 550, and outputs the motor torque Tev input from the motor torque command map 550 as a motor torque command value. When the MT mode is selected by the HMI unit 42, the output torque switching unit 560 switches to connect to the required motor torque calculation unit 540, and outputs the motor torque Tmt input from the required motor torque calculation unit 540 as a motor torque command value. Such input switching is performed in conjunction with selection of the control mode by the HMI unit 42.

However, the output torque switching unit 560 enables selection of the control mode by the HMI unit 42 on condition that the SOC of the battery 14 is within a predetermined range. The SOC is calculated from the voltage of the battery 14 measured by the voltmeter 48. The predetermined range of the SOC is defined as a region of a second threshold or more and a first threshold or less. The first threshold is set to a value higher than half the capacity of the battery 14, i.e., higher than 50%, and lower than an overcharge region. The second threshold is set to a value lower than 50% and higher than an overdischarge region. When the SOC is higher than the first threshold and when the SOC is lower than the second threshold, the output torque switching unit 560 connects to the motor torque command map 550 regardless of the control mode selected by the HMI unit 42. In other words, when the SOC is out of the predetermined range, driving in the EV mode is forcibly performed. In this case, the control device 50 displays on the display of the HMI unit 42 that driving in the MT mode is not allowed.

When the SOC is higher than the first threshold, the control mode is limited to the EV mode. This can prevent in advance the power that is supplied to the electric motor 2 from being limited by allowable discharge power. As a result, there is less likely to be a gap between the acceleration expected by the driver and the actual acceleration due to an insufficient driving force in the MT mode. When the SOC is lower than the second threshold, the control mode is also limited to the EV mode. This can prevent in advance the regenerative power from the electric motor 2 from being limited by allowable charge power. As a result, there is less likely to be a gap between the deceleration expected by the driver and the actual deceleration due to insufficient regeneration in the MT mode.

When the SOC of the battery 14 becomes higher than the first threshold or lower than the second threshold in a situation where driving in the MT mode is already being performed, the output torque switching unit 560 switches to connect to the motor torque command map 550. In other words, the control mode is forcibly switched from the MT mode to the EV mode. In this case, the control device 50 notifies the driver that the control mode will be switched from the MT mode to the EV mode by using the display of the HMI unit 42, before the output torque switching unit 560 switches to connect to the motor torque command map 550.

As described above, when the SOC is out of the predetermined range, driving in the MT mode is not allowed and driving in the EV mode is forcibly performed. The enjoyment of driving is less likely to be spoiled by the condition of the SOC of the battery 14.

Figure 4:
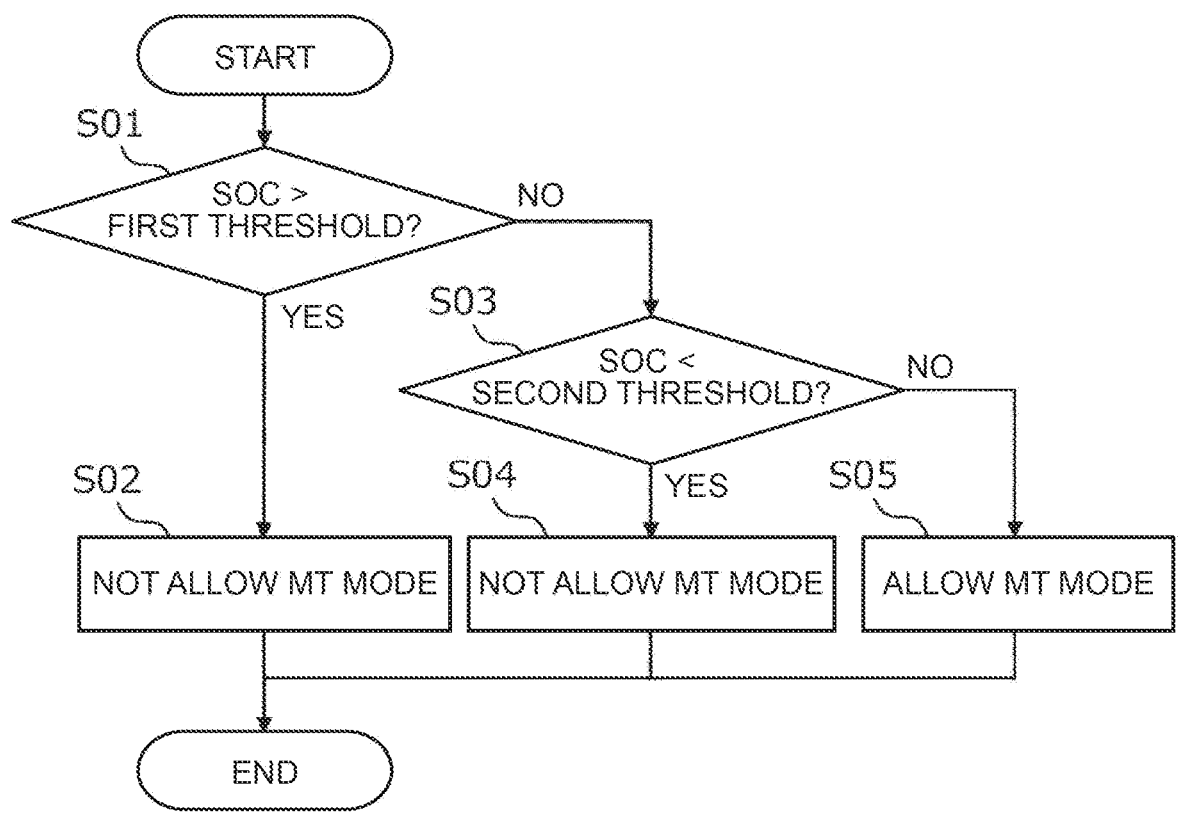
FIG. 4 is a flowchart showing a process of determining whether to allow an MT mode based on the SOC of a battery.

FIG. 4 is a flowchart showing a process of determining whether to allow the MT mode based on the SOC of the battery 14. This determination is made by the output torque switching unit 560. In step S01, it is determined whether the SOC is higher than the first threshold. When the SOC is higher than the first threshold, the routine proceeds to step S02. In step S02, the MT mode is not allowed. When the SOC is equal to or less than the first threshold, the routine proceeds to step S03. In step S03, it is determined whether the SOC is lower than the second threshold. When the SOC is lower than the second threshold, the routine proceeds to step S04. In step S04, the MT mode is not allowed.

When the MT mode is not allowed in step S02 or S04 and driving is currently being performed in the EV mode, switching to the MT mode is not allowed and the driving in the EV mode is continued. When the MT mode is not allowed in step S02 or S04 and driving is currently being performed in the MT mode, the MT mode is canceled and the control mode is forcibly switched to the EV mode.

When the SOC is equal to or less than the first threshold and equal to or higher than the second threshold, the routine proceeds to step S05. In step S05, the MT mode is allowed. When the MT mode is allowed and driving is currently performed in the EV mode, the control mode is switched to the MT mode according to the mode selection operation. When the MT mode is allowed and driving is currently performed in the MT mode, the driving in the MT mode is continued.

2-2. MT Vehicle Model 2-2-1. Overview

Figure 5:
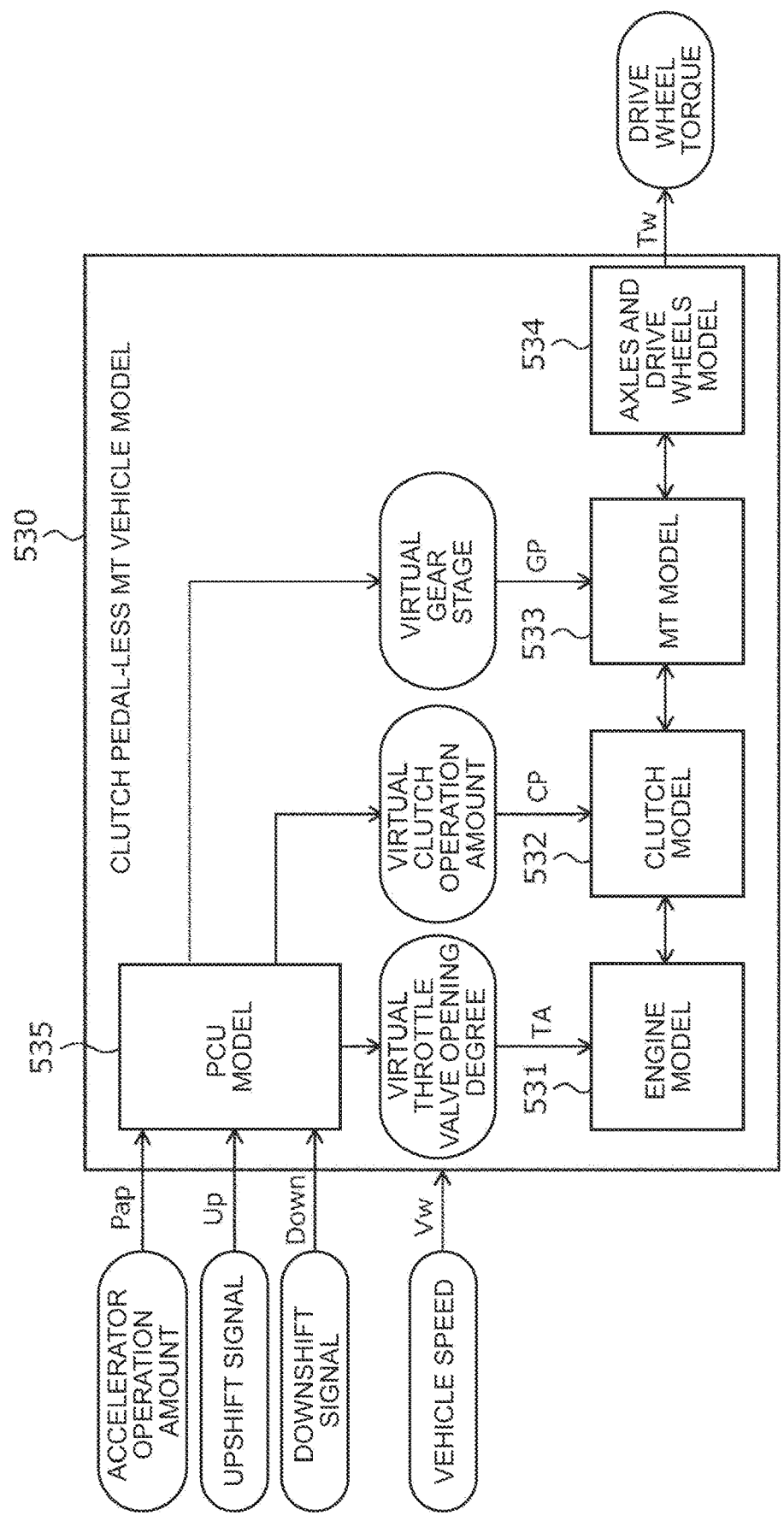
FIG. 5 is a block diagram showing an example of an MT vehicle model in the control device shown in FIG. 3.

Next, the MT vehicle model 530 will be described. FIG. 5 is a block diagram showing an example of the MT vehicle model 530. The MT vehicle model 530 is composed of an engine model 531, a clutch model 532, an MT model 533, an axles and drive wheels model 534, and a plant control unit (PCU) model 535. The engine model 531 models the virtual engine. The virtual engine of the present embodiment is a spark ignition engine whose torque is controlled by the throttle valve opening degree. The clutch model 532 models the virtual clutch. The MT model 533 models the virtual SMT. The axles and drive wheels model 534 models a virtual torque transmission system from the axles to the drive wheels. The PCU model 535 models part of functions of a virtual plant control unit (PCU) that integrally controls the virtual engine, the virtual clutch, and the virtual SMT. For example, each model may be represented by a calculation formula or may be represented by a map.

The calculation results are transferred between the models. The accelerator operation amount Pap, upshift signal Su, and downshift signal Sd that are input to the MT vehicle model 530 are used in the PCU model 535. The vehicle speed Vw (or wheel speeds) is used in the plurality of models. The MT vehicle model 530 calculates the drive wheel torque Tw and virtual engine rotational speed Ne based on these input signals.

2-2-2. PCU Model

The PCU model 535 calculates a virtual throttle valve opening degree of the virtual engine, a virtual clutch operation amount of the virtual clutch, and a virtual gear stage of the virtual SMT. The PCU model 535 is composed of a throttle valve opening degree model for calculating the virtual throttle valve opening degree, a clutch operation amount model for calculating the virtual clutch operation amount, and a gear stage model for calculating the virtual gear stage.

The throttle valve opening degree model receives inputs of the accelerator operation amount Pap, the upshift signal Su, and the downshift signal Sd, and outputs a virtual throttle valve opening degree TA. In the throttle valve opening degree model, the virtual throttle valve opening degree TA is associated with the accelerator operation amount Pap. The virtual throttle valve opening degree TA is increased as the accelerator operation amount Pap increases. However, when the upshift signal Su is input and when the downshift signal Sd is input, the virtual throttle valve opening degree TA is temporarily reduced regardless of the accelerator operation amount Pap. This means that the virtual throttle is temporarily closed when a shift operation of the pseudo paddle shifter 26 is performed. The virtual throttle valve opening degree TA output from the throttle valve opening degree model is input to the engine model 531.

The clutch operation amount model receives inputs of the upshift signal Su and the downshift signal Sd and outputs a virtual clutch operation amount CP. The virtual clutch operation amount CP is basically set to 0%. That is, the basic state of the virtual clutch is the engaged state. When the upshift signal Su is input and when the downshift signal Sd is input, the virtual clutch operation amount CP is temporarily set to 0%. This means that the virtual clutch is temporarily disengaged when a shift operation of the pseudo paddle shifter 26 is performed. The virtual clutch operation amount CP when engaging the virtual clutch is calculated using the vehicle speed Vw and the virtual engine speed. The clutch operation amount model calculates the virtual clutch operation amount CP based on the rotational speed difference so that the rotational speed of an input shaft of the virtual SMT calculated from the vehicle speed Vw and the virtual engine speed smoothly match each other. The virtual clutch operation amount CP output from the clutch operation amount model is input to the clutch model 532.

The gear stage model receives inputs of the upshift signal Su and the downshift signal Sd and outputs a virtual gear stage GP. The number of gear stages of the virtual SMT is N (N is a natural number equal to or greater than 2). The virtual gear stage GP is shifted up by one every time the upshift signal Su is input. However, when the virtual gear stage GP is the Nth stage, the virtual gear stage GP is kept at the Nth stage even when the upshift signal Su is input. The virtual gear stage GP is shifted down by one every time the downshift signal Sd is input. However, when the virtual gear stage GP is the first stage, the virtual gear stage GP is kept at the first stage even when the downshift signal Sd is input. The virtual gear stage GP output from the gear stage model is input to the MT model 533.

2-2-3. Engine Model

The engine model 531 calculates a virtual engine speed Ne and virtual engine output torque Teout. The engine model 531 is composed of a model for calculating the virtual engine speed Ne and a model for calculating the virtual engine output torque Teout. For example, a model given by the following equation (1) is used to calculate the virtual engine speed Ne. In the equation (1), the virtual engine speed Ne is calculated from rotational speeds Nw of the wheels 8, an overall reduction ratio R, and a slip ratio Rslip of the virtual clutch.

Mathematical 1

$$Ne = Nw \times R \times \frac{1}{1 - Rslip} \qquad (1)$$

In the equation (1), the rotational speeds Nw of the wheels 8 are detected by the wheel speed sensors 30. The overall reduction ratio R is calculated from a gear ratio r calculated by the MT model 533 that will be described later and a reduction ratio defined by the axles and drive wheels model 534. The slip ratio Rslip is calculated by the clutch model 532 that will be described later.

However, the equation (1) is a formula for calculating the virtual engine speed Ne in a state where the virtual engine and the virtual SMT are connected by the virtual clutch. When the virtual clutch is disengaged, virtual engine torque Te generated by the virtual engine is considered to be used to increase the virtual engine speed Ne. The virtual engine torque Te is the sum of the virtual engine output torque Teout and torque due to the moment of inertia. When the virtual clutch is disengaged, the virtual engine output torque Teout is zero. Therefore, when the virtual clutch is disengaged, the engine model 531 calculates the virtual engine speed Ne by the following equation (2) using the virtual engine torque Te and the moment of inertia J of the virtual engine. A map using the virtual throttle valve opening degree TA as a parameter is used to calculate the virtual engine torque Te.

Mathematical 2

$$J \times \frac{30}{\pi} \times \frac{d}{dt} = Ne = Te \qquad (2)$$

The engine model 531 calculates the virtual engine output torque Teout from the virtual engine speed Ne and the virtual throttle valve opening degree TA. For example, such a map as shown in FIG. 6 is used to calculate the virtual engine output torque Teout. This map defines the relationship among the virtual throttle valve opening degree TA, the virtual engine speed Ne, and the virtual engine output torque Teout in a steady state. This map gives the virtual engine output torque Teout for the virtual engine speed Ne for each virtual throttle valve opening degree TA. The torque characteristics shown in FIG. 6 may be set to characteristics for a diesel engine by replacing the virtual throttle valve opening degree TA with a virtual fuel injection amount. The virtual engine output torque Teout calculated by the engine model 531 is input to the clutch model 532.

2-2-4. Clutch Model

The clutch model 532 calculates a torque transmission gain k. The torque transmission gain k is a gain for calculating the degree of torque transmission of the virtual clutch according to the virtual clutch operation amount CP. The clutch model 532 has, for example, such a map as shown in FIG. 6. This map gives the torque transmission gain k for the virtual clutch operation amount CP. In FIG. 6, the torque transmission gain k is 1 when the virtual clutch operation amount CP is in the range from CP0 to CP1, monotonically decreases with a constant slope to zero as the virtual clutch operation amount CP changes from CP1 to CP2, and is zero when the virtual clutch operation amount CP is in the range from CP2 to CP3. Here, CP0 corresponds to the clutch operation amount of 0%, and CP3 corresponds to the clutch operation amount of 100%. The range from CP0 to CP1 and the range from CP2 to CP3 are dead zones in which the torque transmission gain k does not change with the virtual clutch operation amount CP.

The clutch model 532 calculates clutch output torque Tcout using the torque transmission gain k. The clutch output torque Tcout is torque output from the virtual clutch. For example, the clutch model 532 calculates the clutch output torque Tcout from the virtual engine output torque Teout and the torque transmission gain k by the following equation (3). The clutch output torque Tcout calculated by clutch model 532 is input to the MT model 533.

Mathematical 3

$$Tcout = Teout \times k \qquad (3)$$

The clutch model 532 also calculates the slip ratio Rslip. The slip ratio Rslip is used to calculate the virtual engine speed Ne in the engine model 531. As in the case of the torque transmission gain k, a map that gives the slip rate Rslip for the amount of depression Pc of a clutch pedal can be used to calculate the slip rate Rslip. Instead of such a map, the slip ratio Rslip may be calculated from the torque transmission gain k by the following equation (4) representing the relationship between the slip ratio Rslip and the torque transmission gain k.

Mathematical 4

$$Rslip = 1 - k \qquad (4)$$

2-2-5. MT Model

The MT model 533 calculates the gear ratio r. The gear ratio r is a gear ratio determined by the virtual gear stage GP in the virtual SMT. The MT model 533 has, for example, such a map as shown in FIG. 6. This map gives the gear ratio r for the virtual gear stage GP. As shown in FIG. 6, the higher the virtual gear stage GP, the lower the gear ratio r.

The MT model 533 calculates transmission output torque Tgout using the gear ratio r. The transmission output torque Tgout is torque output from the virtual SMT. For example, the MT model 533 calculates the transmission output torque Tgout from the clutch output torque Tcout and the gear ratio r by the following equation (5). The transmission output torque Tgout calculated by the MT model 533 is input to the axles and drive wheels model 534.

Mathematical 5

$$Tgout = Tcout \times r \qquad (5)$$

2-2-5. Axles and Drive Wheels Model

The axles and drive wheels model 534 calculates the drive wheel torque Tw using a predetermined reduction ratio rr. The reduction ratio rr is a fixed value determined by the mechanical structure from the virtual SMT to the drive wheels 8. The reduction ratio rr multiplied by the gear ratio r is the overall reduction ratio R described above. For example, the axles and drive wheels model 534 calculates the drive wheel torque Tw from the transmission output torque Tgout and the reduction ratio rr by the following equation (6). The drive wheel torque Tw calculated by the axles and drive wheels model 534 is output to the required motor torque calculation unit 540.

Mathematical 6

$$Tw = Tgout \times rr \qquad (6)$$

3. Others

In the above embodiment, a lever type pseudo shifter may be provided instead of the paddle type pseudo shifter. The lever type pseudo shifter is configured to output an upshift signal when the shift lever is tilted forward, and to output a downshift signal when the shift lever is tilted backward. In the above embodiment, a pseudo H-type shifter and a pseudo clutch pedal may be provided instead of the pseudo sequential shifter. In this case, the clutch model of the MT vehicle model calculates the torque transmission gain according to the amount of depression of the pseudo clutch pedal. The MT model of the MT vehicle model calculates the gear ratio according to the shift position of the pseudo H-type shifter.

What is claimed is:

1. A battery electric vehicle that uses as a traction power unit an electric motor configured to run on power supplied from a battery and that stores regenerative power in the battery, the battery electric vehicle comprising:
   an accelerator pedal;
   a shifter;
   a mode selector configured to select either a first mode or a second mode as a control mode for the electric motor according to a mode selection operation by a driver; and
   a processor configured to control the electric motor, wherein the processor is configured to,
      control the electric motor in the control mode selected by the mode selector when a state of charge of the battery is within a predetermined range,
      control the electric motor in the first mode, regardless of the control mode selected by the mode selector, when the state of charge of the battery is out of the predetermined range,
      change an output of the electric motor according to an operation of the accelerator pedal, regardless of an operation position of the shifter, when controlling the electric motor in the first mode, and
      change an output characteristic of the electric motor for the operation of the accelerator pedal according to the operation position of the shifter when controlling the electric motor in the second mode, wherein
         the processor is configured to notify the driver that the control mode is going to be switched from the second mode to the first mode when the state of charge goes out of the predetermined range during control of the electric motor in the second mode.

2. A battery electric vehicle that uses as a traction power unit an electric motor configured to run on power supplied from a battery and that stores regenerative power in the battery, the battery electric vehicle comprising:
   an accelerator pedal;
   a shifter;
   a mode selector configured to select either a first mode or a second mode as a control mode for the electric motor according to a mode selection operation by a driver; and
   a processor configured to control the electric motor, wherein the processor is configured to,
      control the electric motor in the control mode selected by the mode selector when a state of charge of the battery is within a predetermined range,
      control the electric motor in the first mode, regardless of the control mode selected by the mode selector, when the state of charge of the battery is out of the predetermined range,
      change an output of the electric motor according to an operation of the accelerator pedal, regardless of an operation position of the shifter, when controlling the electric motor in the first mode, and
      change an output characteristic of the electric motor for the operation of the accelerator pedal according to the operation position of the shifter when controlling the electric motor in the second mode, wherein:
         a first threshold of the predetermined range is greater than half a capacity of the battery; and
         the processor is configured to control the electric motor in the first mode when the state of charge is higher than the first threshold.

3. A battery electric vehicle that uses as a traction power unit an electric motor configured to run on power supplied from a battery and that stores regenerative power in the battery, the battery electric vehicle comprising:
   an accelerator pedal;
   a shifter;
   a mode selector configured to select either a first mode or a second mode as a control mode for the electric motor according to a mode selection operation by a driver; and
   a processor configured to control the electric motor, wherein the processor is configured to,
      control the electric motor in the control mode selected by the mode selector when a state of charge of the battery is within a predetermined range,
      control the electric motor in the first mode, regardless of the control mode selected by the mode selector, when the state of charge of the battery is out of the predetermined range,
      change an output of the electric motor according to an operation of the accelerator pedal, regardless of an operation position of the shifter, when controlling the electric motor in the first mode, and
      change an output characteristic of the electric motor for the operation of the accelerator pedal according to the operation position of the shifter when controlling the electric motor in the second mode, wherein:
         a second threshold of the predetermined range is smaller than half the capacity of the battery; and
         the processor is configured to control the electric motor in the first mode when the state of charge is lower than the second threshold.

* * * * *